May 21, 1963      A. J. DIEBOLD      3,090,657

MOTION-TRANSMITTING DEVICE

Filed Aug. 29, 1960

INVENTOR.
ALFRED J. DIEBOLD

BY W. E. Recktenwald
P. J. Rose
ATTORNEY

United States Patent Office 3,090,657
Patented May 21, 1963

3,090,657
MOTION-TRANSMITTING DEVICE
Alfred J. Diebold, Gary, Ind., assignor to The Anderson Company, a corporation of Indiana
Filed Aug. 29, 1960, Ser. No. 52,607
5 Claims. (Cl. 308—217)

This invention relates to a motion-transmitting mechanism of the antifriction screw-and-nut type, and more particularly the invention comprises an improved cage or carrier for the bearing elements of such mechanisms.

As an example of the mechanism mentioned, reference is made to nut assemblies manufactured by The Anderson Company of Gary, Indiana, including antifriction bearing elements marketed under the trademark Roton. In one form of the assembly, a tubular casing is provided to pass over and be moved along a threaded shaft, the casing being formed with raceways for receiving bearing elements arranged between the casing and the threaded shaft. A cage or carrier is also fitted between the casing and the shaft, and the cage has circumferentially spaced openings therethrough in which the bearing elements are positioned about the shaft.

In the past, cages for nut assemblies of the kind mentioned have been formed of sections taken from rather heavy gage tubular stock, either of metal or plastic material, such as nylon. The heavy stock and the generally small internal diameter of the cages has made it necessary to drill or otherwise cut the bearing receiving pockets in the tubular body, which practice has involved a painstaking and precise procedure. Because of their tubular nature and the precision demanded, production of cages by die-casting or moulding has proven more expensive and less satisfactory than machining.

It is, therefore, the principal object of this invention to provide a cage for nut assemblies of the kind mentioned, which cage is of extremely simple construction comprised of substantially less material than prior cages, and which offers marked economy of manufacture.

A still further object of this invention is to provide a cage formed entirely from a strip of relatively thin sheet metal.

A further object of this invention is to provide an improved and simple method of producing cages of the kind aforementioned.

In general, according to my invention I provide an elongate section of thin tubular stock, preferably of sheet metal, having circumferentially spaced recesses provided therein for receiving rotary bearing elements through which the toroidal portions of said elements may project, the edge portions associated with said recesses being deformed to provide axle sockets or fins for simultaneously engaging and positioning the bearing elements as well as for centering the cage within the nut assembly. I produce the foregoing cage by first providing an elongate blank of sheet metal having a length equal to the desired girth and of a width equal to the length of cage desired. At precise spaced points along the blank, by punching, stamping and/or slitting of the blank I provide recesses having side fins, as well as sockets for the axles of the bearing elements. The ends of the blank are then brought together and secured in abutting relation in the manner that the shells for cans are formed, with the fins and sockets protruding from the exterior, thus completing construction of my novel cage.

Figure 1:
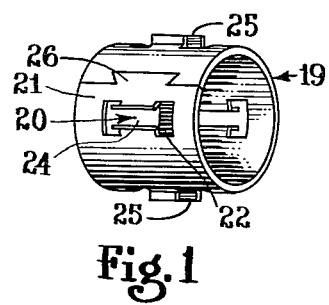
FIGURE 1 is an isometric view of a first form of my improved cage.
Figure 2:
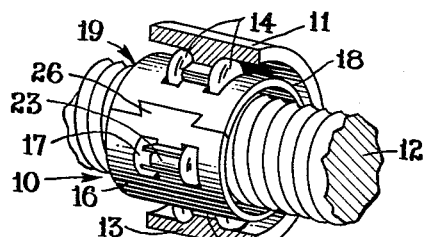
FIGURE 2 is a cutaway view showing the same cage within a nut assembly.

In detail, and referring first to FIGURES 1 and 2, reference character 10 designates a nut assembly including a tubular nut means or casing 11 which telescopically receives helically threaded shaft 12. The casing is illustrated as having intermediate its ends a radially reduced portion 13 providing at each end thereof a concave shoulder portion or abutment surface 14 disposed radially of the shaft. The interior surface 15 of reduced portion 13 is cylindrical. Preferably elongate rotatable bearing elements 16, of the type alluded to above, are fitted within the annular area between casing 11 and the shaft. Each element 16 has formed thereon axially spaced toroidal bearing surfaces 17 to engage substantially simultaneously both the shoulders 14 of casing 11 and the threads of the shaft. The toroidal surfaces are spaced axially of each rotatable element 16 a distance substantially equal to the axial distance between the abutment surfaces 14, so that the toroidal portions 17 neatly nest within the area 18 of largest diameter of the casing. The engagement of the bearing elements between the shoulder portion 14 of the casing and the threads of the shaft limits relative axial movement between the casing and the shaft. Additionally, the toroidal surfaces engage their respective threads of the shaft at spaced-apart points and make a rolling engagement with a side of the thread to effect the relative rotational and longitudinal movement between the nut assembly and the shaft. Rotating or longitudinally moving either the casing or the shaft produces longitudinal or rotational movement, respectively, in the other.

To accomplish shifting of the nut means along shaft 12, the shaft is illustrated as formed with quadruple threads, and one bearing element 16 is provided for each thread, the four elements being spaced 90 degrees apart. By this arrangement all four of the bearing elements 16 may be arranged at substantially the same point axially of the shaft, as shown. The number of threads provided on the shaft is not critical, and within reason the number may be increased or diminished as the exigencies dictate.

The tubular cage 19 of this invention is shown disposed between the casing 11 and shaft 12, and has recesses 20 in its wall 21 in which the rotatable elements 16 are received and thereby retained in spaced relation about the periphery of shaft 12. The cage also retains the longitudinal axis of the rotatable elements and the shaft in a desired relation.

According to the present invention cage 19 comprises a tubular body preferably formed of sheet metal. The cage as shown has four circumferentially spaced recesses 20 formed therein, one recess for each of the respective bearing elements. The recesses may be in the form of openings provided in the cage, or socket portions stamped therein and associated with openings through which the toroidal portions may extend. In the form of the invention of FIGURES 1 and 2 the ends of each opening 20 are widened at 22 to receive the toroidal portions 17 of the bearing elements; while the intermediate portion is of a dimension to neatly receive the intermediate axle portion 23 thereof. The edges of the intermediate portion of each recess is provided with radially extending fins 24 to engage the elements and assure precise positioning and prevent wedging thereof. It is pointed out that the diameter or distance between the outer edges 25 of homologous diametrically disposed fins should be but slightly less than the internal diameter of reduced portion 13 of the casing to assure a nice fit of the cage therein.

As indicated, the cylindrical body of the cage is made from a flat sheet metal blank, after the general practice followed in the manufacture of the cylindrical shells of cans. Preferably the recesses are formed in the blank before it is shaped into cylindrical form. In this connection, the enlarged portions 22 of the recesses are punched out of the blank, and the intermediate strip between the portions 22 is slit along its center, the material bordering either side of the slit being bent radially outward to provide the fins 24. The punching and slitting may be performed in a single operation, and it is contemplated that gang punches and cutters may form the several recesses in a single operation. The ends of the finished blank may then be brought together into the cylindrical shape shown, with the fins protruding radially, and secured in any conventional manner. I have illustrated as a suitable joint for the ends of the blank the use of the interlocked dovetail arrangement 26.

Figure 3:
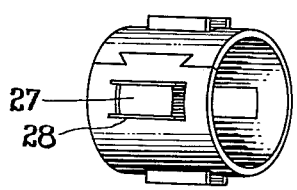
FIGURE 3 is an isometric view of a variant of the cage shown in FIGURE 1.
Figure 4:
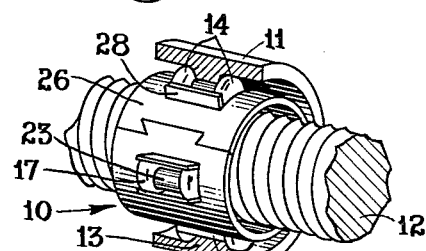
FIGURE 4 is a cutaway view showing the same cage within a nut assembly.
Figure 5:
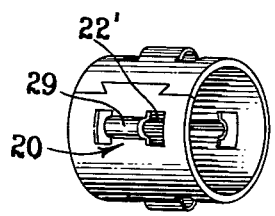
FIGURE 5 is an isometric view of a modification of the cage of this invention.
Figure 6:
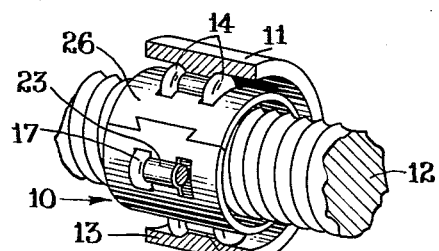
FIGURE 6 is a cutaway view showing the same cage within a nut assembly.
Figure 7:
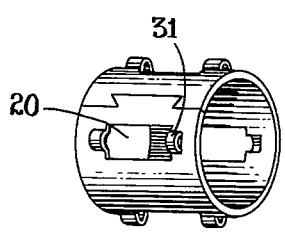
FIGURE 7 is an isometric view of a variant of the cage shown in FIGURE 5.
Figure 8:
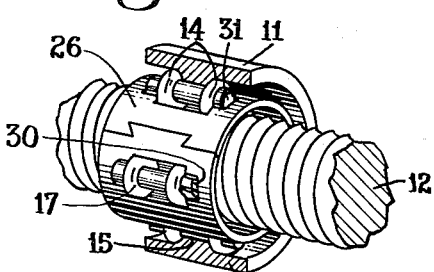
FIGURE 8 is a cutaway view showing the same cage within a nut assembly.

Turning to the three modifications of FIGURES 3-8, it is pointed out that in each of FIGURES 4, 6 and 8, the nut assembly is identical with that shown in FIGURE 2, differing only in picturing various modifications of the cage in the organization of FIGURE 2. It is, therefore, unnecessary to describe the basic nut assembly anew with regard to each modification and in FIGURES 4, 6 and 8, parts identical with those of FIGURE 2 bear the same reference characters.

The form of the invention of FIGURES 3 and 4 constitutes what may be termed an economy model cage. It differs from that of FIGURES 1 and 2 in that simple elongate rectangular recesses 27 are formed axially in the cage, and the fins 28 of each recess extend lengthwise of the entire long edges thereof. As a result, in this construction the opposed fins straddle and engage the toroidal portions 17 of the bearing elements, rather than the intermediate shaft portion thereof, as in FIGURES 1 and 2.

In the modification of FIGURES 5 and 6, the ends of each recess terminate in openings 22' of a size to receive the toroidal portions 17 of elements 16, similar to the arrangement of FIGURES 1 and 2. The intermediate portion in this form of the invention, however, is pressed or stretched outwardly into semicylindrical configuration 29 and of a size to rotatably receive the central axle portion or shaft 23 of the bearing element in the groove formed on the inner face thereof. In FIGURE 6, the toroidal portion of the right-hand end of element 16 is shown cut away to clearly reveal how axle portion 23 is journaled in the concave side of the semicylindrical portion 29. As in the case of the fins, the crown of the outer cylindrical surfaces 29 project sufficiently to cooperate with the inner cylindrical surface 15 of reduced portion 13 to maintain a snug fit for the cage.

The form of the invention of FIGURES 7 and 8 is intended for use with those bearing elements having end axles or pintles 30. This form of the invention is characterized by simple elongate rectangular recesses—devoid of fins. The edges defining the ends of each recess have press-formed therein radially outwardly extending bearing sockets 31 for the axles 30 of the bearing elements.

It will be appreciated from the above that, aside from the simplicity and economy of the manner in which the cage is provided with the several recesses, the present invention offers a marked savings in material. In the conventional cage, the thickness of the material generally approaches the over-all thickness of the present cage wall plus the radial dimension of the fins 24 or semicylindrical portion 29. This invention, therefore, cuts substantially by half the amount of material per cage, and even more for certain situations.

I claim:

1. A cage for elongate rotatable bearing elements having spaced-apart toroidal portions connected by a shaft portion comprising a cylindrical tube section, the wall of said section being formed with circumferentially spaced elongate recesses extending axially thereof, each for receiving an elongate bearing element, the ends of each recess terminating in circumferentially enlarged portions for reception of said toroidal portions, the opposed edges between said enlarged portions being connected by an integral portion having a longitudinally disposed bearing recess therein for receiving the shaft portion for retaining the respective elements in relative position.

2. A cage for the bearing elements of screw-and-nut assemblies of the type described comprising a cylindrical tube section, the wall of said section being formed with circumferentially spaced elongate recesses extending axially thereof, each for receiving an elongate bearing element having spaced toroidal portions, the ends of each recess terminating in openings through which the toroidal portions of one of said elements may extend, and the portion of said recess between said openings being deformed outwardly into generally semicylindrical shape for receiving the intermediate axle portion of said one of the elements.

3. A cage for elongate rotatable bearing elements having spaced toroidal and end axle portions comprising: a cylindrical tube section, the wall of said section being formed with circumferentially spaced elongate openings extending axially thereof, each for receiving an elongate bearing element, the edge portions defining the ends of each opening being deformed outwardly to provide sockets for the axles of said elements for retaining the respective elements in relative position.

4. A cage for spacing elongate bearing elements having spaced-apart radially enlarged bearing surfaces connected by an intermediate axle peripherally thereof comprising: a cylindrical tube section formed with a plurality of axially spaced-apart annular rows of radially directed recesses in the wall thereof, a portion of the wall between said recesses of adjacent rows being formed to define a generally semicylindrical receiving portion disposed parallel to the axis of the cylindrical tube and terminating at each end in one of said openings, said receiving portion adapted to rotatably receive an intermediate axle to retain respective elongate bearing elements in relative position.

5. A cage for spacing elongate antifriction elements of a screw-nut assembly comprising: a cylindrical tube section, the walls of the tube being formed with circumferentially spaced radially directed recesses for receiving elongate antifriction elements therein, a portion of the wall adjacent the openings being deformed into a semicylindrical receiving surface disposed parallel with the axis of the cylindrical tube section and adapted to rotatably receive in bearing relationship an axle portion of the elongate antifriction elements to retain respective elongate antifriction elements in relative position.

References Cited in the file of this patent

UNITED STATES PATENTS

| | | |
|---|---|---|
| 311,171 | Blakey | June 27, 1885 |
| 493,791 | Schurig | Mar. 21, 1893 |
| 1,878,055 | Wittliff | Sept. 20, 1932 |
| 2,022,189 | Engstrom | Nov. 26, 1935 |
| 2,076,180 | Griswold | Apr. 6, 1937 |
| 2,122,365 | Beck | June 28, 1938 |
| 2,150,852 | Tinnerman | Mar. 14, 1939 |
| 2,246,022 | Tinnerman | June 17, 1941 |
| 2,266,923 | Trbojevich | Dec. 23, 1941 |
| 2,350,538 | Selnes | June 6, 1944 |
| 2,359,120 | Kilayin | Sept. 26, 1944 |
| 2,591,160 | Kilian | Apr. 1, 1952 |
| 2,715,925 | Morgan | Aug. 23, 1955 |
| 2,739,491 | Russell | Mar. 27, 1956 |
| 2,768,532 | Russell | Oct. 30, 1956 |
| 2,966,071 | Wise | Dec. 27, 1960 |